US011850954B2

(12) United States Patent
Lu et al.

(10) Patent No.: US 11,850,954 B2
(45) Date of Patent: Dec. 26, 2023

(54) ELECTRIFIED VEHICLE INVERTER WITH DUAL NEUTRAL LEGS

(71) Applicant: Ford Global Technologies, LLC, Dearborn, MI (US)

(72) Inventors: Xi Lu, Northville, MI (US); Krishna Prasad Bhat, Canton, MI (US); Ke Zou, Canton, MI (US); Chingchi Chen, Ann Arbor, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 17/674,922

(22) Filed: Feb. 18, 2022

(65) Prior Publication Data

US 2023/0264577 A1    Aug. 24, 2023

(51) Int. Cl.
| | | |
|---|---|---|
| *B60L 50/60* | (2019.01) | |
| *H02M 7/5387* | (2007.01) | |
| *H02P 27/06* | (2006.01) | |
| *H02M 3/158* | (2006.01) | |
| *B60L 1/00* | (2006.01) | |

(52) U.S. Cl.
CPC ............ *B60L 50/60* (2019.02); *H02M 7/5387* (2013.01); *H02P 27/06* (2013.01); *B60L 1/006* (2013.01); *B60L 2210/10* (2013.01); *B60L 2210/40* (2013.01); *H02M 3/158* (2013.01)

(58) Field of Classification Search
CPC .. B60L 50/60; B60L 2210/10; B60L 2210/40; B60L 1/006; H02M 7/5387; H02M 3/158; H02P 27/06
See application file for complete search history.

(56) References Cited

U.S. PATENT DOCUMENTS

| | | | |
|---|---|---|---|
| 7,839,020 B2 | 11/2010 | Nakanishi | |
| 10,800,364 B2 | 10/2020 | Khafagy et al. | |
| 2014/0347769 A1 | 11/2014 | Kanda et al. | |
| 2020/0122585 A1* | 4/2020 | Bhat | G05B 19/0426 |
| 2021/0104851 A1* | 4/2021 | Bhat | B60L 55/00 |
| 2022/0294380 A1* | 9/2022 | Xie | H02J 7/02 |
| 2023/0048414 A1* | 2/2023 | Kinomura | B60L 1/003 |
| 2023/0049338 A1* | 2/2023 | Kinomura | H02J 7/0045 |
| 2023/0049374 A1* | 2/2023 | Kinomura | B60R 16/0315 |
| 2023/0226936 A1* | 7/2023 | Haghbin | B60L 53/24 |
| | | | 701/22 |

* cited by examiner

*Primary Examiner* — Rexford N Barnie
*Assistant Examiner* — Terrence R Willoughby
(74) *Attorney, Agent, or Firm* — Brooks Kushman PC; David B Kelley

(57) ABSTRACT

An electrified vehicle and associated inverter configured for powering two different types of external loads include first and second phase/line legs combined with a first neutral leg coupled to a vehicle chassis, and a second floating neutral leg that is not coupled to the vehicle chassis. The first/second phase legs and first neutral leg are coupled to a first receptacle configured to receive a corresponding plug to power a first load, such as a power tool or accessory. The first/second phase legs and the second neutral leg are coupled to a second receptacle configured to receive a corresponding plug to power a second load, such as a home or building having an earth grounding electrode. The inverter may include an isolation transformer between the loads and the traction battery, and/or may be configured to provide single phase, split-phase, or three-phase power for either or both of the neutral connections.

20 Claims, 5 Drawing Sheets

ELECTRIFIED VEHICLE INVERTER WITH DUAL NEUTRAL LEGS

TECHNICAL FIELD

This disclosure relates to an electrified vehicle having an inverter with dual neutral legs to provide power to different types of external loads.

BACKGROUND

An electrified vehicle (EV) such as a plug-in hybrid-electric vehicle (PHEV), battery electric vehicle (BEV), or similar vehicle that has a high-voltage traction battery to store and provide energy for vehicle propulsion may also function as a power source to provide power to various types of external loads. The external power may be provided to power tools, lighting, accessories, etc. in addition to emergency or back-up power provided to homes and buildings, for example. Various external loads may have different power requirements with respect to voltage, current, ground/neutral connections, connector configurations, etc.

SUMMARY

An electrified vehicle includes an inverter configured for powering two different types of external loads having different ground/neutral requirements. The inverter includes first and second phase/line legs combined with a first neutral leg coupled to a vehicle chassis, and a second floating neutral leg that is not coupled to the vehicle chassis. The first/second phase legs and first neutral leg are coupled to a first receptacle configured to receive a corresponding plug to power a first external load, such as a power tool or accessory. The first/second phase legs and the second neutral leg are coupled to a second receptacle configured to receive a corresponding plug to power a second load, such as a home or building having an earth grounding electrode. The inverter may include an isolation transformer between the loads and the traction battery, and/or may be configured to provide single phase, split-phase, or three-phase power for either or both of the neutral configurations.

Configurations according to the disclosure may include an electrified vehicle having a traction battery and an inverter coupled to the traction battery and operable to convert direct current (DC) power from the traction battery to alternating current (AC) power. The inverter may include a first phase leg, a second phase leg, a first neutral leg connected to a chassis of the electrified vehicle, and a second floating neutral leg not connected to the chassis of the electrified vehicle. The vehicle may include a first receptacle having conductors connected to the first phase leg, the second phase leg, and the first neutral leg, and a second receptacle having conductors connected to the first phase leg, the second phase leg, and the second neutral leg. The inverter may be coupled to the traction battery by an isolation transformer. The inverter may be coupled to the traction battery by a DC/DC converter that converts the traction battery voltage to a desired voltage for the converter to provide one or more corresponding AC voltages to either or both of the receptacles.

The inverter may include an output filter coupled to the first and second phase legs and the first and second neutral legs. The output filter may include an inductor (L) and a capacitor (C) connected as an LC filter for each of the phase legs and each of the neutral legs. The output filter may include a first and second inductor (L) with a capacitor (C) connected between the inductors to form an LCL filter for each of the phase legs and the neutral legs. The electrified vehicle may include a three-phase electric machine coupled to the inverter. The inverter may provide single phase, split-phase, or three-phase power to one or more of the external loads. The inverter may be coupled to the traction battery by first and second capacitors connected in series across the traction battery, wherein the phase legs and the neutral legs are coupled between the first and second capacitors by the output filter.

Embodiments according to the disclosure may include a method for supplying power from an electrified vehicle to a first external load and a second external load. The method may include converting DC power from a traction battery of the electrified vehicle to AC power coupled to a first phase conductor, a second phase conductor, and a first neutral conductor for the first external load, the first neutral conductor connected to a chassis of the electrified vehicle, and converting the DC power from the traction battery of the electrified vehicle to AC power coupled to the first phase conductor, the second phase conductor, and a second neutral conductor for the second external load, the second neutral conductor being a floating neutral not connected to the chassis of the electrified vehicle. The method may also include coupling the first phase conductor, the second phase conductor, and the first and second neutral conductors to an output filter comprising at least one inductor (L) and a capacitor (C) configured as an LC or LCL filter. Converting DC power from the traction battery may include isolating the traction battery from the first and second external loads via an isolation transformer. Converting DC power from the traction battery may also include converting DC voltage from the traction battery at a first DC voltage to a second DC voltage lower than the first DC voltage. The method may also include supplying power to the first external load via a first receptacle connected to the first and second phase conductors and the first neutral conductor, and supplying power to the second external load via a second receptacle connected to the first and second phase conductors and the second neutral conductor.

Configurations may include an electrified vehicle inverter having first, second, third, and fourth transistor pairs configured for coupling across positive and negative terminals of a high-voltage traction battery, each of the transistor pairs connected in series, a first phase leg connected between the first transistor pair, a second phase leg connected between the second transistor pair, a first neutral leg connected between the third transistor pair, and a second neutral leg connected between the fourth transistor pair, and a controller programmed to control switching of the transistor pairs to convert DC voltage/current from the high-voltage traction battery to AC voltage/current supplied to the first and second phase legs and the first neutral leg, and supplied to the first and second phase legs and the second neutral leg. The electrified vehicle inverter may include a coupling capacitor connected across the transistor pairs and configured for coupling across the high-voltage traction battery. The electrified vehicle inverter may include first and second DC coupling capacitors connected in series and connected across the transistor pairs and configured for coupling across the high-voltage traction battery. The electrified vehicle inverter may include a DC/DC converter coupled across the transistor pairs and configured for coupling to the high-voltage traction battery. The electrified vehicle inverter may include an output filter connected between: a) the phase legs and the neutral legs; and b) the first and second DC coupling capacitors.

One or more embodiments according to the disclosure may have associated advantages. For example, embodiments according to the disclosure provide an electrified vehicle having an inverter/converter configured to use an on-board traction battery to supply AC power to external loads and accommodate different neutral/ground requirements for various types of external loads including loads that require grounding to the vehicle chassis as well as loads that require grounding via the external load, such as a home or building. Power may be provided to both types of loads simultaneously subject to aggregate power/current limits. The inverter may provide split-phase, single phase, and/or three-phase power to an external load depending on the particular implementation.

DETAILED DESCRIPTION

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

Figure 1:
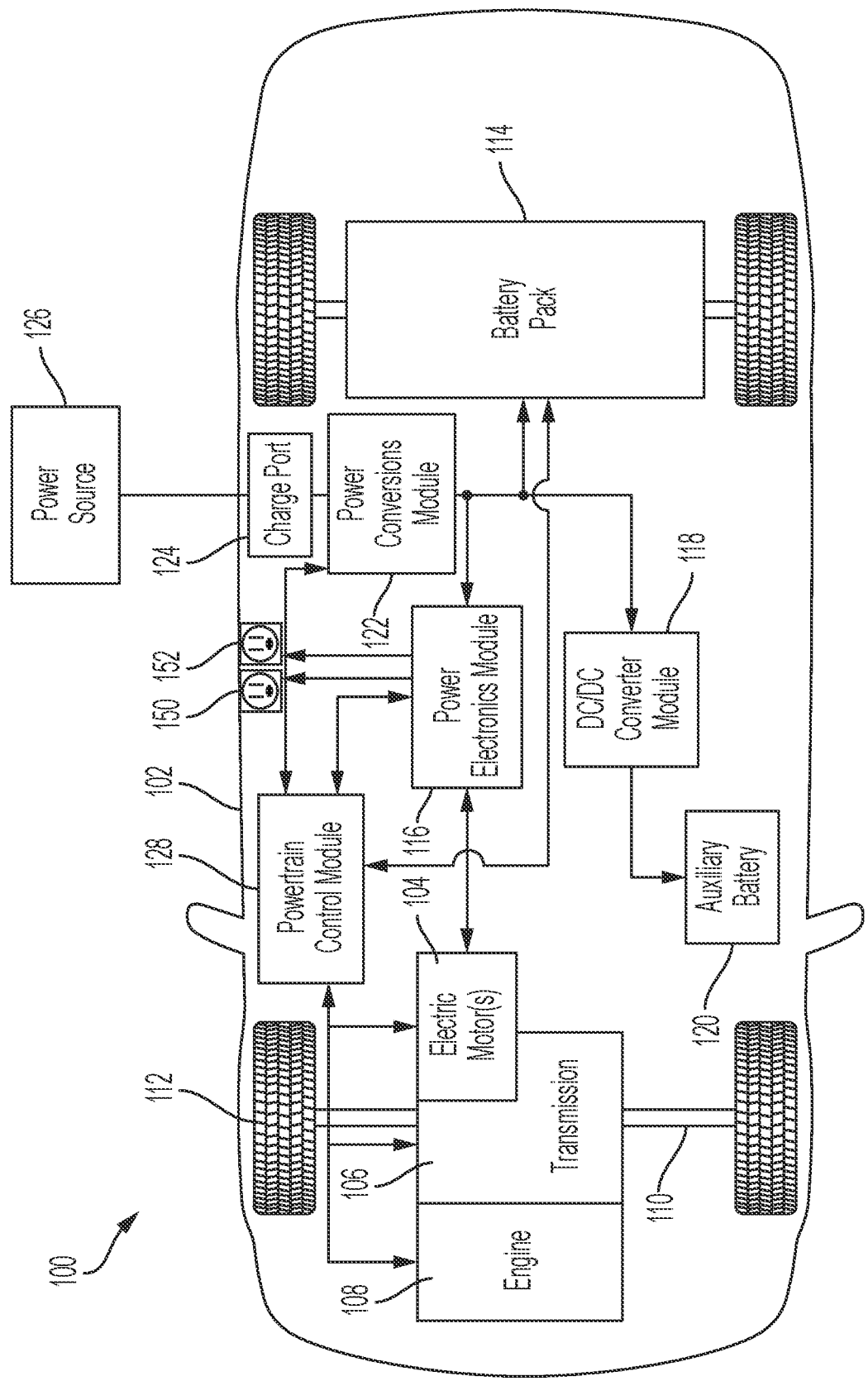
FIG. 1 is block diagram of a representative electrified vehicle having an inverter with dual neutral legs.

FIG. 1 depicts an example of an electrified vehicle 100 implemented as a plug-in hybrid-electric vehicle. The electrified vehicle 100 may comprise one or more three-phase electric machines 104 mechanically connected to a transmission 106. In addition, the transmission 106 is mechanically connected to an engine 108 for hybrid implementations. The transmission 106 may also be mechanically connected to a drive shaft 110 that is mechanically connected to the wheels 112. The electric machines or motor/generators 104 can provide propulsion whether the engine 108 is turned on or off. The electric machines 104 may operate as motors, generators, or both and can provide fuel economy benefits by recovering energy that would normally be lost as heat. Depending on the particular configuration, engine 108 may be used to power one or more electric machines 104 operating as a generator to power one or more external loads as described herein. Power may be provided directly from one or more electric machines 104, or indirectly by charging battery pack 114. Electrified vehicle 100 may also be implemented as a battery electric vehicle (BEV) without an engine 108 and powered solely by traction battery 114.

Traction battery or battery pack 114 stores energy that can be used by the electric machines 104 and/or to power one or more external loads. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 may include an inverter to convert the DC voltage/current provided by the battery pack 114 to an AC voltage/current to power the electric machines. In one or more embodiments, the AC voltage/current may also be supplied to one or more receptacles 150, 152 to power corresponding external loads as described herein. In other embodiments the power electronics module 116 may include two or more inverter/converters are provided with at least one traction inverter powering the electric machines and at least one auxiliary load inverter/converter powering auxiliary devices and external loads. As generally described herein, separate power electronics modules may be provided for the traction motors and external loads whether or not explicitly described as such.

The inverter of the power electronics module 116 may be configured to generate single phase, split phase, and/or three-phase AC voltage/current for the electric machines 104 and/or receptacles 150, 152 at various voltages depending on the particular application. In some applications, power electronics module 116 may include a first inverter dedicated to bi-directional power transfer between battery pack 114 and electric machine(s) 104, and a second inverter dedicated to supplying power to one or more receptacles to power auxiliary or external loads. In a regenerative mode, the power electronics module 116 will convert the three-phase AC current from the electric machines 104 acting as generators to the DC voltage required to recapture energy in the battery pack 114.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric machines, battery, power conversion, power electronics, and various other control modules, components, or systems may be controlled by a powertrain control module (PCM) 128. Alternatively, or in combination, various systems or subsystems may include associated control modules or controllers in communication with PCM 128 over a vehicle wired or wireless network to provide coordinated control of the vehicle.

Figure 2:
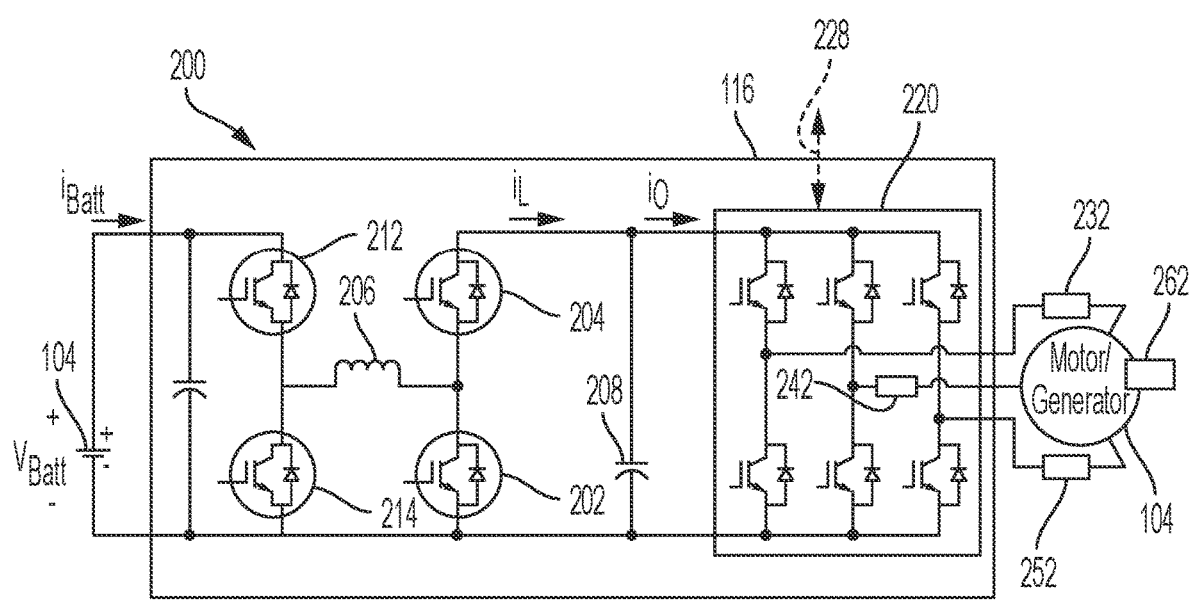
FIG. 2 is a block diagram illustrating operation of a representative electrified vehicle inverter coupling an HV traction battery to an electric machine (motor/generator).

FIG. 2 illustrates a traction battery 114 coupled to a power electronics module 116 connected to a three-phase electric machine 104 in a representative electrified vehicle 100. One or more contactors or high voltage switches controlled by an associated controller, such as powertrain control module 128, may be operated to selectively connect battery voltage from battery 114 to power electronics module 116 after completing various diagnostic routines. These high voltage switches may be implemented by relays, insulated gate bipolar junction transistors (IGBTs), metal oxide semiconductor field effect transistors (MOSFETs), bipolar junction transistors (BJTs), and/or other electro-mechanical or solid-state switches. The system may include a pre-charge circuit to limit the current flow from battery 114 while the system is powering up.

Power electronics module 116 may include DC/DC or buck-boost converter circuitry 200 upstream of inverter components 220 to drive one or more electric machines 104 and/or power external auxiliary loads. The power electronics module 116 may include a boost circuit with an inductor 206, a switch 212 to charge an electric field in the inductor 206, and a switch 214 to discharge the electric field and change the voltage to drive the motor/generator 104. This power electronics module 200 may also include a buck circuit using inductor 206 and switches 202 and 204. This DC/DC convertor circuit will convert the battery voltage to an operational voltage which may be greater than the battery terminal voltage. The buck-boost power converter 200 may use IGBTs, BJTs, MOSFETs, relays, or other electro-mechanical or solid-state switches. The use of IGBTs with Fast Recovery Diodes (FRDs) in this diagram is exemplary and may be accomplished using MOSFETs, BJTs, or other electro-mechanical or solid-state switches. The capacitor 208 is used to filter the voltage generated by the DC/DC convertor so that the operational voltage applied to the inverter 210 is generally stable. This buck-boost circuit is intended to change the voltage of a high voltage battery 114 (having a voltage greater than 60V DC), to an operating voltage different than the battery voltage. An example of this is a high voltage battery of 90-400 volts being changed to an operating voltage of 100-1200 volts.

As previously described, inverter 220 converts the DC voltage/current to single phase, split-phase, and/or three-phase AC voltage/current (depending on the particular configuration) provided to electric machine 104 and/or external loads as illustrated and described with respect to FIGS. 3-6. As described in greater detail herein, inverter 220 communicates with an associated controller as indicated at 228 to control the transistor pairs to generate a desired voltage amplitude and waveform across the various legs connecting the inverter 220 to the machine 104 and/or other loads. Current sensors 232, 242, 252 associated with each phase/leg may optionally be provided to monitor current flow. Electric machine 104 may include a resolver or other rotational position sensor 262 that provides a corresponding signal indicative of rotational position/speed of the rotor of electric machine 104.

Figure 3:
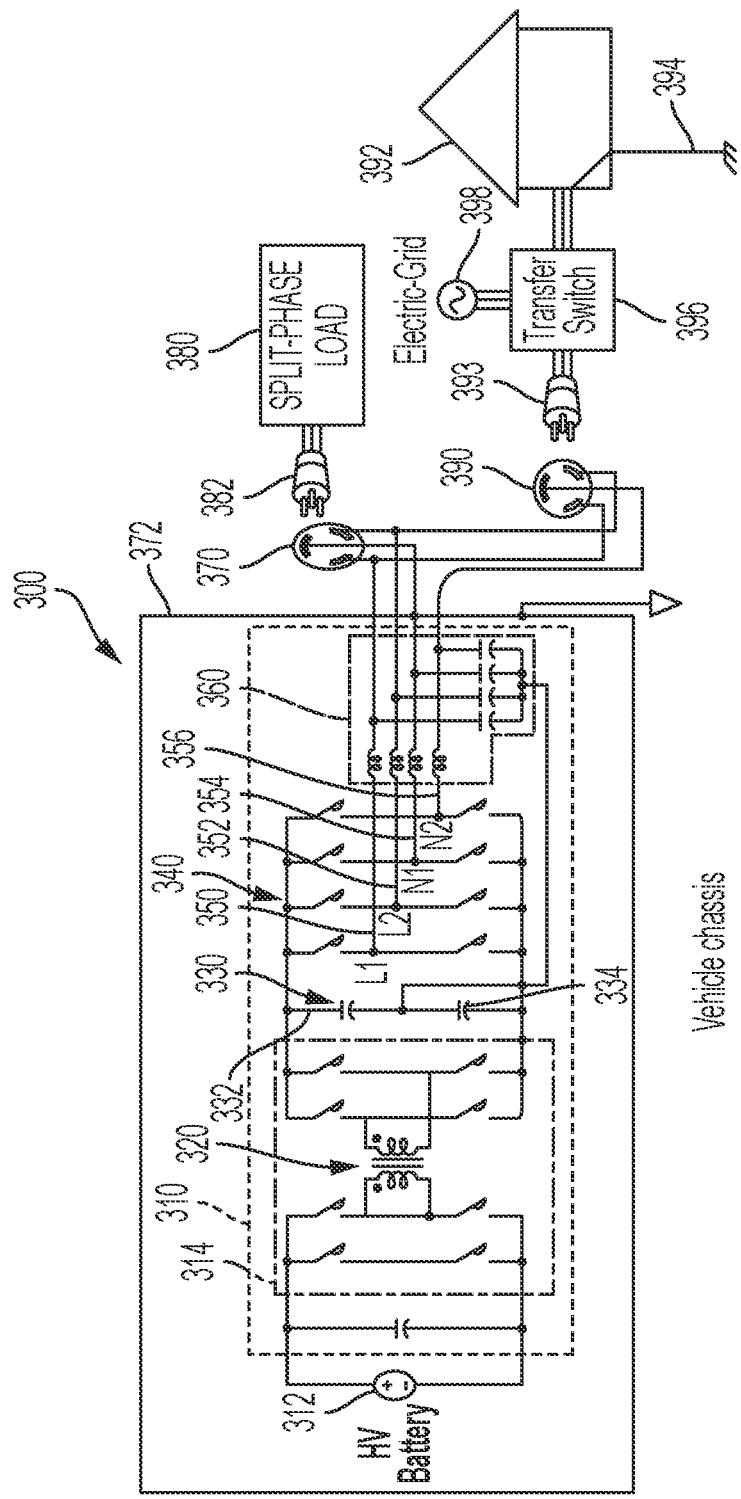
FIG. 3 illustrates an electrified vehicle with an isolated converter/inverter having a first receptacle with neutral connected to the vehicle chassis to power a first external load, and a second receptacle with a floating neutral to power a second external load.
Figure 6A:
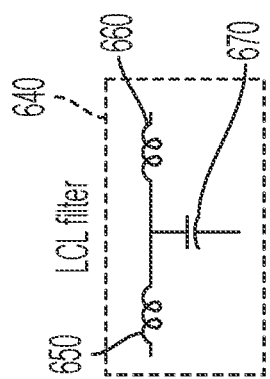
FIG. 6A illustrates a representative LC output filter for a converter/inverter phase or neutral leg.
Figure 6B:
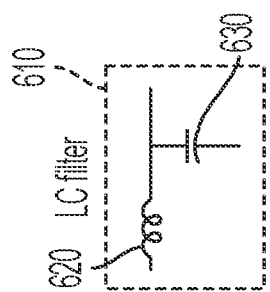
FIG. 6B illustrates a representative LCL output filter for a converter/inverter phase or neutral leg.

FIG. 3 illustrates an electrified vehicle with an isolated converter/inverter having a first receptacle with neutral connected to the vehicle chassis to power a first external load, and a second receptacle with a floating neutral to power a second external load. System 300 includes an isolated converter/inverter 310 coupled to an HV battery 312 of an electrified vehicle. A DC/DC converter 314 includes an isolation transformer 320 and may be used to increase or decrease the voltage provided by the HV battery 312. A DC link capacitor 330 includes a split capacitor configuration having a first capacitor 332 connected in series to a second capacitor 334 with the split capacitor pair connected across the positive and negative poles of the HV battery 312 via the DC/DC converter 314. Switching pairs 340, which may be implemented by transistors forming transistor pairs, are controlled by a corresponding controller as previously described to convert the DC voltage from the DC/DC converter 314 to a desired AC voltage waveform with a desired amplitude or voltage level selected for the particular loads supplied by the system 300. A first phase leg (L1) 350 is connected between a first transistor pair, a second phase leg (L2) 352 is connected between a second transistor pair, a first neutral leg (N1) 354 is connected between a third transistor pair, and a second neutral leg (N2) 356 is connected between a fourth transistor pair. An additional transistor pair (not shown) may be provided with a third phase leg connected between the transistors to provide three-phase power to an external load, or to on-board electric machines, for example. The phase legs and neutral legs are connected to respective legs of an output filter 360, which is implemented by an LC filter in this example. The output filter capacitors are connected between the DC link capacitors 330. Other types of output filters may be used as illustrated in FIGS. 6A and 6B, for example.

A first auxiliary or external load power receptacle 370 includes connections to the phase legs (L1 and L2) 350, 352 and the first neutral leg 354, which is connected to the vehicle chassis 372 such that power receptacle 370 is configured to power a non-grounded split-phase load 380 coupled to receptacle 370 by an associated power plug 382. The plug configuration may vary based on the particular type of power provided and/or to satisfy local or regional standards, for example. As generally understood by those of ordinary skill in the art, a split-phase configuration as illustrated may be used to provide a first AC voltage across either phase leg 350, 352 and neutral leg 354, or a second AC voltage across the first phase leg 350 and second phase leg 352. While a split-phase configuration is shown in FIG. 3, the converter/inverter 372 may also be configured to provide single-phase power and/or three-phase power depending on the particular application and implementation.

A second auxiliary or external load power receptacle 390 includes conductors connected to the phase legs (L1 and L2) 350, 352 and the second neutral leg 356, which is a floating neutral that is not connected to the vehicle chassis 372 such that the power is configured for a grounded external load such as a house or building 392 having a ground electrode 394. House or building 392 is connected to the receptacle 390 of the electrified vehicle by a corresponding plug 393, and may include an associated transfer switch 396 to connect/disconnect power from an electric grid 398.

Figure 4:
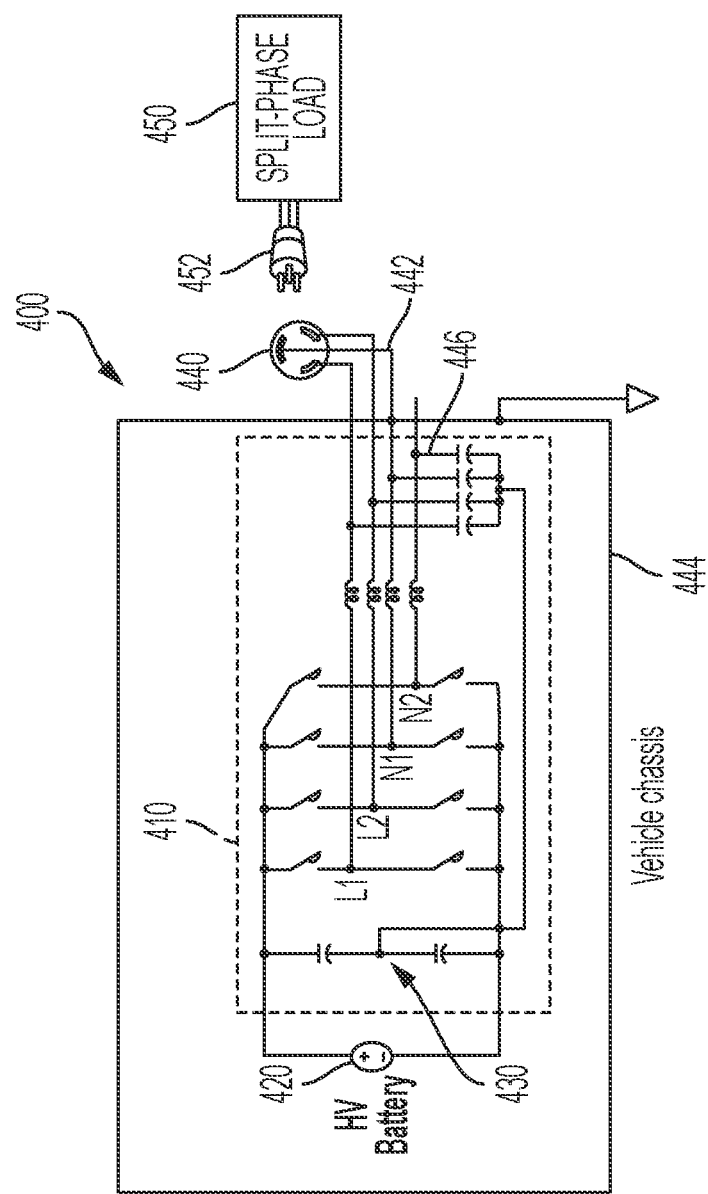
FIG. 4 illustrates an electrified vehicle with a non-isolated converter/inverter configuration having dual neutral legs for powering first and second external loads.

FIG. 4 illustrates an electrified vehicle with a non-isolated converter/inverter configuration having dual neutral legs for powering first and second external loads. The converter/inverter system 400 operates as generally described with respect to the isolated converter/inverter example system 300 as previously described. However, non-isolated converter 410 does not include an isolation transformer between the HV battery 420 and the inverter switches. HV Battery 420 is coupled by DC link capacitors 430 arranged in a split capacitor configuration. A single DC link capacitor may alternatively be used as illustrated and described with respect to the example of FIG. 5. The non-isolated converter 410 includes first and second phase legs (L1 and L2), a first neutral leg 442 connected to the vehicle chassis 444 and a second neutral leg 446 that is not connected to the vehicle chassis 444. A first receptacle 440 includes connections to the first and second phase legs (L1 and L2) and the first neutral leg 442 to power a split-phase load 450 coupled by a plug 452. A second receptacle (not shown) may be provided with connections to phase legs L1 and L2 and neutral leg 446, which is not connected to the vehicle chassis 444, to power an external load having an earth ground electrode, such as a house or building as previously described.

Figure 5:
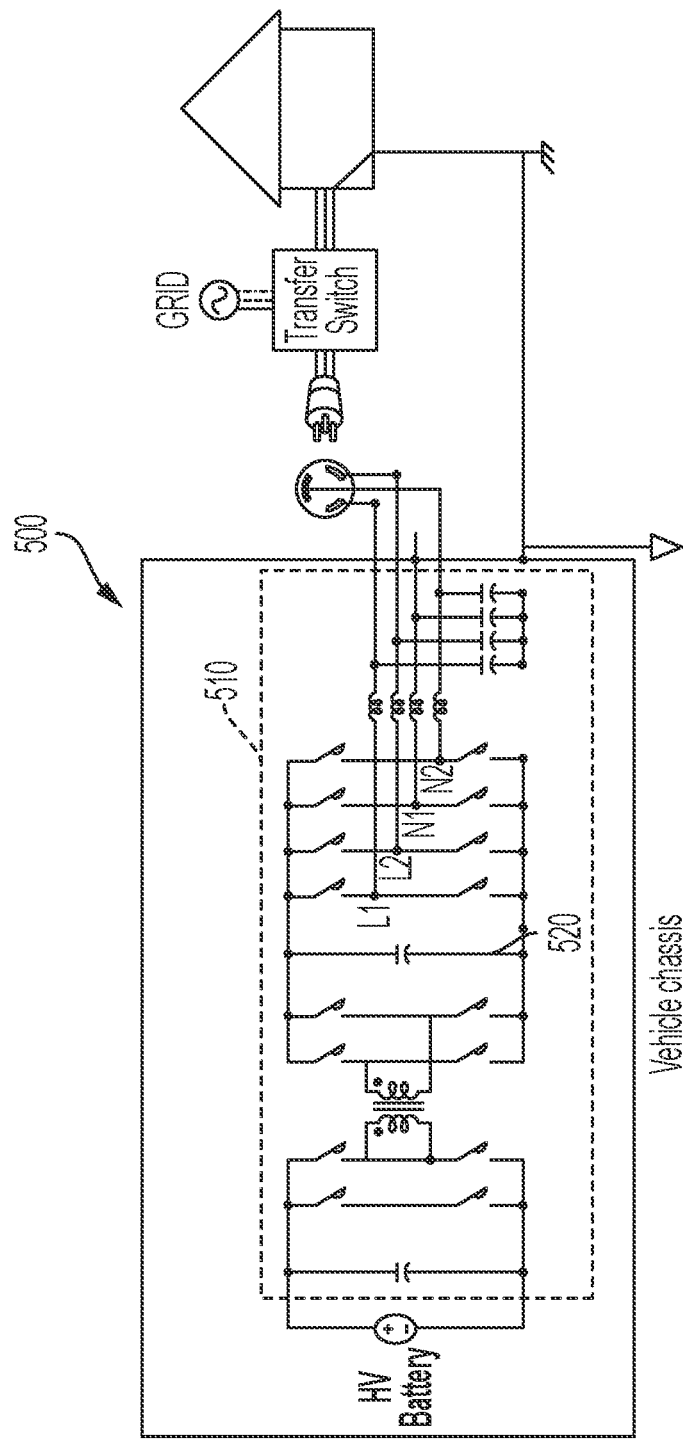
FIG. 5 illustrates an electrified vehicle with an isolated converter/inverter coupled to the HV battery without a split DC link capacitor.

FIG. 5 illustrates an electrified vehicle with an isolated converter/inverter coupled to the HV battery without a split DC link capacitor. As described with respect to the previous examples, the converter/inverter system 500 includes dual neutral legs with one neutral leg connected to the vehicle chassis for powering ungrounded external loads and another neutral leg not connected to the vehicle chassis for powering grounded external loads. In contrast to previous examples, system 500 includes an isolated converter 510 that is coupled to the switching transistor pairs by a single DC link capacitor 520 rather than a split capacitor configuration. In the illustrated example, the external load is a house or building having a ground electrode such that the neutral connection provided by the vehicle is not connected to the vehicle chassis.

FIGS. 6A and 6B illustrate alternative representative output filter configurations for use in an electrified vehicle converter/inverter according to the disclosure. FIG. 6A illustrates a representative LC output filter 610 for a converter/inverter phase leg and/or neutral leg having an inductor 620 connected in series with the load and a capacitor 630 connected between the load and common. FIG. 6B illustrates a representative LCL output filter 640 for an electrified vehicle converter/inverter phase leg and/or neutral leg according to the disclosure. Output filter 640 includes a first inductor 650 connected in series with a second inductor 660 with the first and second inductors 660 connected in series with the external load. A capacitor 670 is connected between the inductors 650, 660 to common.

As illustrated in FIGS. 1-6, a method for supplying power from an electrified vehicle 100 to a first external load 380 and a second external load 392 according to the disclosure includes converting DC power from a traction battery 114 of the electrified vehicle 100 to AC power coupled to a first phase conductor (L1), a second phase conductor (L2), and a first neutral conductor (N1) for the first external load 380, the first neutral conductor connected to a chassis 372 of the electrified vehicle 100; and converting the DC power from the traction battery 114 of the electrified vehicle 100 to AC power coupled to the first phase conductor (L1), the second phase conductor (L2), and a second neutral conductor (N2) for the second external load, the second neutral conductor (N2) not connected to the chassis of the electrified vehicle.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electrified vehicle comprising:
a traction battery; and
an inverter coupled to the traction battery and operable to convert direct current (DC) power from the traction battery to alternating current (AC) power, the inverter including a first phase leg, a second phase leg, a first neutral leg connected to a chassis of the electrified vehicle, and a second neutral leg not connected to the chassis of the electrified vehicle.

2. The electrified vehicle of claim 1 further comprising a first receptacle having conductors connected to the first phase leg, the second phase leg, and the first neutral leg, and a second receptacle having conductors connected to the first phase leg, the second phase leg, and the second neutral leg.

3. The electrified vehicle of claim 1 wherein the inverter is coupled to the traction battery by an isolation transformer.

4. The electrified vehicle of claim 3 wherein the inverter is coupled to the traction battery by a DC/DC converter.

5. The electrified vehicle of claim 1 further comprising an output filter coupled to the first and second phase legs and the first and second neutral legs.

6. The electrified vehicle of claim 5 wherein the output filter comprises an inductor (L) and a capacitor (C) connected as an LC filter for each of the phase legs and the neutral legs.

7. The electrified vehicle of claim 5 wherein the output filter comprises a first and second inductor (L) with a capacitor (C) connected between the inductors to form an LCL filter for each of the phase legs and the neutral legs.

8. The electrified vehicle of claim 1 further comprising a three-phase electric machine coupled to the inverter.

9. The electrified vehicle of claim 1 wherein the inverter is coupled to the traction battery by first and second capacitors connected in series across the traction battery, wherein the phase legs and the neutral legs are coupled between the first and second capacitors by an output filter.

10. The electrified vehicle of claim 9 wherein the phase legs and the neutral legs are coupled to the first and second capacitors by corresponding output filter capacitors of an LC or LCL output filter.

11. A method for supplying power from an electrified vehicle to a first external load and a second external load, the method comprising:
   converting DC power from a traction battery of the electrified vehicle to AC power coupled to a first phase conductor, a second phase conductor, and a first neutral conductor for the first external load, the first neutral conductor connected to a chassis of the electrified vehicle; and
   converting the DC power from the traction battery of the electrified vehicle to AC power coupled to the first phase conductor, the second phase conductor, and a second neutral conductor for the second external load, the second neutral conductor being a floating neutral not connected to the chassis of the electrified vehicle.

12. The method of claim 11 further comprising coupling the first phase conductor, the second phase conductor, and the first and second neutral conductors to an output filter comprising at least one inductor (L) and a capacitor (C) configured as an LC or LCL filter.

13. The method of claim 11 wherein each step of converting DC power from the traction battery comprises isolating the traction battery from the first and second external loads via an isolation transformer.

14. The method of claim 11 wherein each step of converting DC power from the traction battery comprises converting DC voltage from the traction battery at a first DC voltage to a second DC voltage lower than the first DC voltage.

15. The method of claim 11 further comprising supplying power to the first external load via a first receptacle connected to the first and second phase conductors and the first neutral conductor, and supplying power to the second external load via a second receptacle connected to the first and second phase conductors and the second neutral conductor.

16. An electrified vehicle inverter comprising:
   first, second, third, and fourth transistor pairs configured for coupling across positive and negative terminals of a high-voltage traction battery, each of the transistor pairs connected in series;
   a first phase leg connected between the first transistor pair, a second phase leg connected between the second transistor pair, a first neutral leg connected between the third transistor pair, and a second neutral leg connected between the fourth transistor pair; and
   a controller programmed to control switching of the transistor pairs to convert DC voltage/current from the high-voltage traction battery to AC voltage/current supplied to the first and second phase legs and the first neutral leg, and supplied to the first and second phase legs and the second neutral leg.

17. The electrified vehicle inverter of claim 16 further comprising:
   a coupling capacitor connected across the transistor pairs and configured for coupling across the high-voltage traction battery.

18. The electrified vehicle inverter of claim 16 further comprising first and second DC coupling capacitors connected in series and connected across the transistor pairs and configured for coupling across the high-voltage traction battery.

19. The electrified vehicle inverter of claim 18 further comprising:
   a DC/DC converter coupled across the transistor pairs and configured for coupling to the high-voltage traction battery.

20. The electrified vehicle inverter of claim 18 further comprising
   an output filter connected between: a) the phase legs and the neutral legs; and b) the first and second DC coupling capacitors.

* * * * *